(12) United States Patent
Jensen (10) Patent No.: US 7,724,863 B2
(45) Date of Patent: May 25, 2010

(54) CORE SPRAY SPARGER T-BOX CLAMP APPARATUS AND METHOD FOR INSTALLING THE SAME

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/963,813

(22) Filed: Oct. 14, 2004

(65) Prior Publication Data

US 2006/0082139 A1  Apr. 20, 2006

(51) Int. Cl.
*G21C 1/04* (2006.01)
(52) U.S. Cl. .................. 376/352; 376/204; 376/282; 376/292; 138/89; 138/97
(58) Field of Classification Search .......... 376/282, 376/352, 245, 260, 204, 292; 138/89, 97; 285/313, 319; 29/890, 890.031, 890.143, 29/40.14
See application file for complete search history.

(56) References Cited

U.S. PATENT DOCUMENTS

| 4,721,330 | A | * | 1/1988 | Woodhouse | 285/148.26 |
|---|---|---|---|---|---|
| 5,076,748 | A | * | 12/1991 | Waterfield et al. | 411/551 |
| 5,511,919 | A | * | 4/1996 | Scalise | 411/555 |
| 5,752,807 | A | * | 5/1998 | Erbes | 417/63 |
| 5,947,529 | A | * | 9/1999 | Jensen | 285/123.6 |
| 6,131,962 | A | * | 10/2000 | Jensen et al. | 285/337 |
| 6,236,700 | B1 | * | 5/2001 | Erbes et al. | 376/260 |
| 6,375,130 | B1 | * | 4/2002 | Jensen et al. | 248/74.1 |
| 6,390,509 | B1 | * | 5/2002 | Wivagg | 285/191 |
| 6,421,406 | B1 | | 7/2002 | Jensen | |
| 6,456,682 | B1 | * | 9/2002 | Jensen | 376/282 |
| 6,477,872 | B1 | * | 11/2002 | Denton, Jr. | 70/129 |
| 6,481,757 | B1 | * | 11/2002 | Pao et al. | 285/125.1 |
| 6,604,449 | B2 | * | 8/2003 | Niessen | 92/13.5 |
| 7,203,263 | B2 | * | 4/2007 | Jensen | 376/352 |
| 7,203,264 | B2 | * | 4/2007 | Lo et al. | 377/64 |

\* cited by examiner

*Primary Examiner*—Rick Palabrica
(74) *Attorney, Agent, or Firm*—Harness, Dickey & Pierce, P.L.C.

(57) ABSTRACT

A core spray sparger T-box attachment assembly for a nuclear reactor pressure vessel, wherein the pressure vessel includes a shroud, a sparger T-box penetrating the shroud, a plurality of sparger distribution header pipes coupled to the sparger T-box, and a downcomer pipe. The sparger header pipes may include at least one sparger nozzle, and the sparger T-box attachment assembly may include a downcomer pipe coupling and a sparger T-box clamp. The sparger T-box clamp may include an anchor plate having a draw bolt opening to receive a draw bolt, a first clamp block substantially aligned at one end of the anchor plate, and a second clamp block substantially aligned at the other end of the anchor plate.

20 Claims, 9 Drawing Sheets

CONVENTIONAL ART

CORE SPRAY SPARGER T-BOX CLAMP APPARATUS AND METHOD FOR INSTALLING THE SAME

BACKGROUND OF INVENTION

1. Field of the Invention

This invention relates generally to nuclear reactors and more particularly, to assemblies and methods for repairing piping within reactor pressure vessel of such reactor.

2. Description of Related Art

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Intergranular stress corrosion cracking (IGSCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Conditions exist in the reactor which contribute to IGSCC of the core spray piping. One area of susceptibility in the core spray piping is the welded joints between the sparger T-box and its associated distribution headers. The sparger T-box is the junction where the core spray downcomer supply pipe penetrates the shroud and branches to distribution sparger pipes. Specifically, the sparger T-box is a straight section of pipe that is capped by a flat plate welded to the end of the pipe. Two sparger pipes are welded to the sparger T-box, thus forming a piping tee. These three welded joints are susceptible to cracking, and in the event that through-wall circumferential cracking should occur at these welded joints, unpredictable leakage could occur. Another area of concern is that the core spray system prevents excessive fuel clad temperature in the event of a Loss of Coolant Accident (LOCA) by delivering cooling water to the core region of the reactor. In the event that through-wall circumferential cracking should occur at these welded joints, the system may be compromised.

In order to prevent unacceptable leakage and to ensure that the core spray system delivers the necessary volumetric flow rate to the reactor core, it would be desirable to provide a clamping system to provide structural integrity to the sparger T-box and to hold the welded joints together in the event that one or more welds fail.

SUMMARY OF INVENTION

Accordingly, the present invention provides a method and apparatus for mechanically clamping the core spray downcomer piping to the shroud, and structurally replacing welds that attach the cover plate and sparger pipe to the sparger T-box.

In an exemplary embodiment, a core spray sparger T-box attachment assembly for a nuclear reactor pressure vessel is disclosed in the present invention. The pressure vessel may include at least a shroud, a sparger T-box penetrating the shroud, a plurality of sparger distribution header pipes coupled to the sparger T-box, and a downcomer pipe. The sparger header pipes may include at least one sparger nozzle. The sparger T-box attachment assembly may include a downcomer pipe coupling and a sparger T-box clamp. The sparger T-box clamp may include at least an anchor plate having a draw bolt opening to receive a draw bolt, a first clamp block substantially aligned at one end of the anchor plate, and a second clamp block substantially aligned at the other end of the anchor plate.

Other exemplary embodiments of the assemblies and methods of the invention separately provide a seal plate coupled to the anchor with a plurality of bolts, wherein the seal plate includes a plurality of bolt openings sized to receive the plurality of bolts and a draw bolt opening sized to receive the draw bolt.

Other exemplary embodiments of the assemblies and methods of the invention separately provide the anchor plate which may include a plurality of openings to receive the plurality of bolts and to align with the plurality of bolt openings on the seal plate.

Other exemplary embodiments of the assemblies and methods of the invention separately provide the anchor plate which may include an adjustable plate, wherein the adjustable plate provides a bearing surface for the draw bolt and permit adjustment for the draw bolt to receive a central portion of the sparger T-box.

Other exemplary embodiments of the assemblies and methods of the invention separately connect the anchor plate and the first and second clamp blocks by a dovetail joint.

Other exemplary embodiments of the apparatuses and methods of the invention separately provide the first and second clamp blocks each including a plurality of aligned T-bolt openings to receive a T-bolt assembly. The T-bolt assembly may include at least a T-bolt, a T-bolt nut and a pipe seal.

In yet another exemplary embodiment, the T-bolt nut may engage a latch spring to permit the rotation of the T-bolt nut in only one direction.

In yet another exemplary embodiment, the T-bolt may be inserted into a vertical slot in the sparger header pipe to provide the T-box clamp a tight seal against the sparger header pipe.

In yet another exemplary embodiment, one end of the pipe seal may be contoured to be similar to a shape of the sparger header pipe.

Other exemplary embodiments of the assemblies and methods of the invention separately provide a plurality of legs extending from a face of the anchor plate. The plurality of legs may be configured to engage an inside surface of the shroud.

In yet another exemplary embodiment, the draw bolt may engage a latch spring to permit the rotation of the draw bolt in only one direction.

Other exemplary embodiments of the assemblies and methods of the invention separately may provide a distal end portion of the plurality of bolts to include a circumferential groove, each of the plurality of bolts may be coupled to the seal plate by a dowel pin. The dowel pin may extend at least partially into the seal plate and be positioned so as to interface with the circumferential groove In yet another exemplary embodiment, the anchor plate may include a plurality of bolt openings and a plurality of slots to accommodate a plurality of bolts and latch springs, respectively.

In yet another exemplary embodiment, the first and second clamp blocks may include a plurality of openings and a plurality of slots to accommodate a plurality of bolts and latch springs, respectively.

These and other features and advantages of this invention are described in, or are apparent from, the following detailed description of various exemplary embodiments of the apparatuses and methods according to the invention.

BRIEF DESCRIPTION OF THE DRAWINGS

The present invention will become more apparent by describing, in detail, exemplary embodiments thereof with reference to the attached drawing, wherein like elements are represented by like reference numerals, which are given by way of illustration only and thus do not limit the exemplary embodiments of the present invention.

DETAILED DESCRIPTION OF THE EXEMPLARY EMBODIMENTS

A core spray sparger T-box attachment assembly in accordance with the invention is designed to mechanically clamp the replacement core spray downcomer piping (lower sectional replacement) to the shroud, and structurally replace welds that attach the cover plate and sparger pipe to the sparger T-box.

Figure 1:
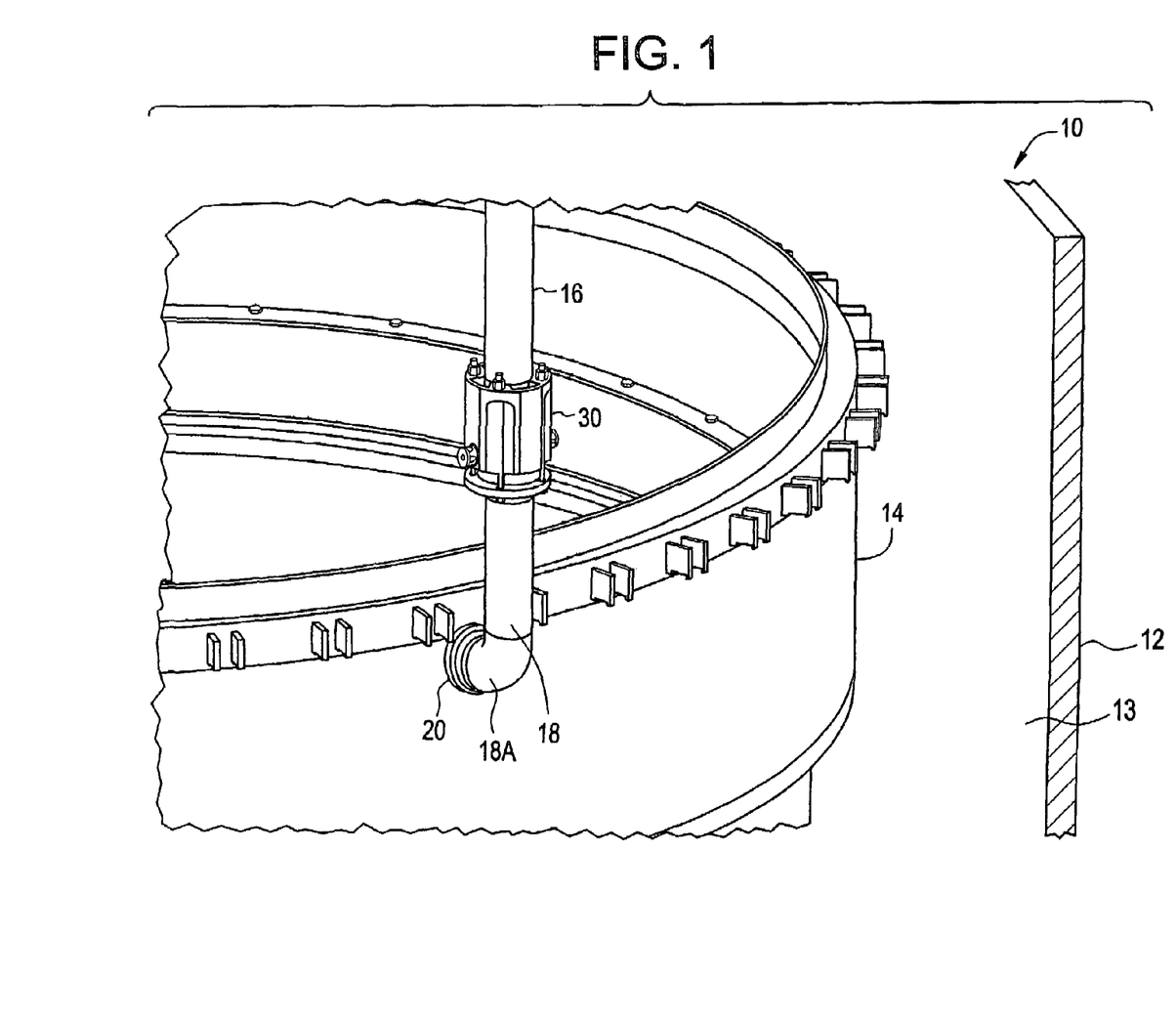
FIG. 1 is an isometric, partial cross-sectional view, with parts cut away, of a reactor pressure vessel (RPV) of a boiling water nuclear reactor.

FIG. 1 is an isometric, partial cross-sectional view, with parts cut away, of a reactor pressure vessel (RPV) of a boiling water nuclear reactor. In particular, FIG. 1 illustrates a shroud showing the spatial arrangement of a downcomer piping and lower sectional replacement which encompasses a coupling and replacement piping elbow. A reactor pressure vessel (RPV) 10 includes a vessel wall 12 and a shroud 14 which surrounds the reactor core (not shown) of RPV 10. An annulus 13 may be formed between vessel wall 12 and shroud 14. The space inside the annulus may be limited, as most reactor support piping may be located within the annulus.

Figure 3:
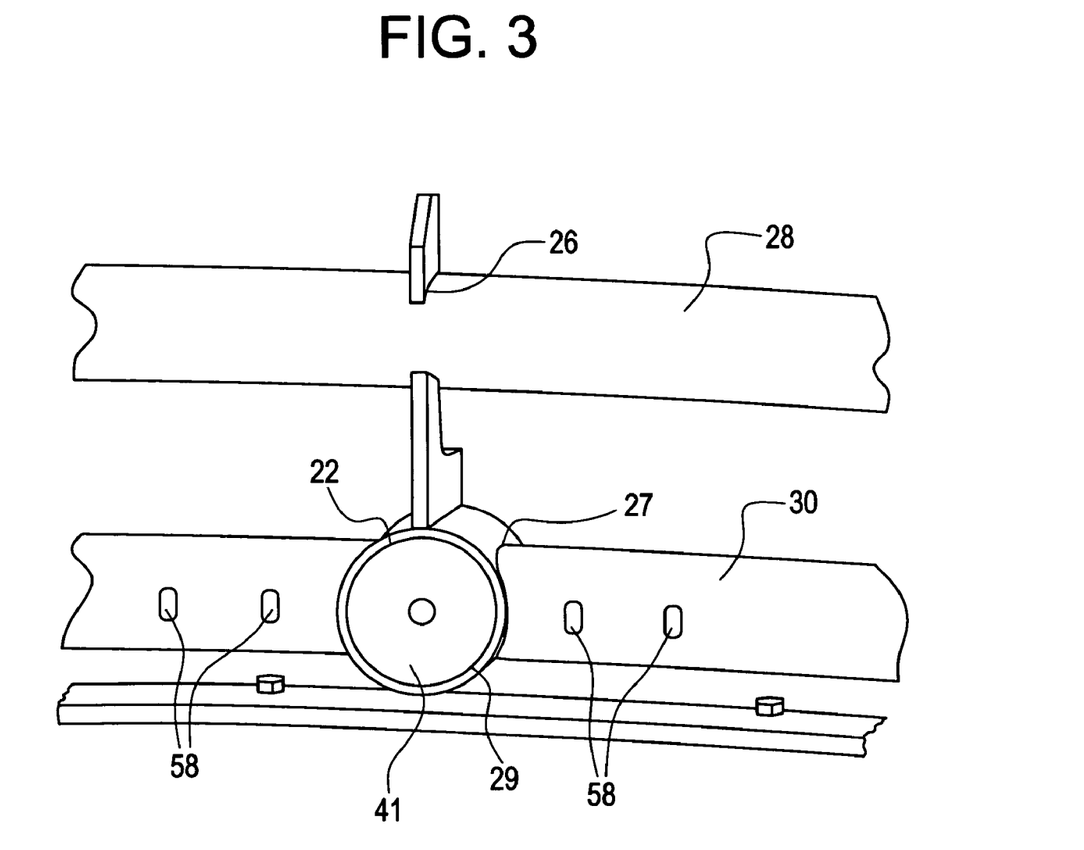
FIG. 3 is an isometric view of a portion of a T-box assembly viewed from the inside of the RPV in accordance with an exemplary embodiment of the invention.

In the event of a reactor plant casualty, such as a loss of coolant accident, cooling water is delivered to the reactor core through core spray distribution header which consists of a horizontal section (not shown) and a vertical section commonly referred to as a downcomer pipe 18. A portion of this downcomer pipe 18, which is in close proximity to the shroud 14, may be removed leaving a remnant of the vertical downcomer piping. Connected between the remnant of the downcomer pipe 16 and the lower sectional replacement pipe (LSR) may be a coupling apparatus 30, which is incorporated by reference in its entirety in U.S. Pat. No. 6,131,962 and U.S. Pat. No. 5,947,529 in order to replace a lower portion of the downcomer pipe 18, if needed, and avoid the use of field welding. Downcomer pipe 18 may include a lower elbow 18A which in turn is connected to shroud 14. The downcomer pipe 18 directs coolant to a sparger T-box 22, which is attached to internal sparger pipes 28, 30. FIG. 3 shows sparger T-box 22 attached to lower internal sparger pipe 30. At another shroud location a similar sparger T-box 22 attaches to upper internal sparger pipe 28.

Figure 2:
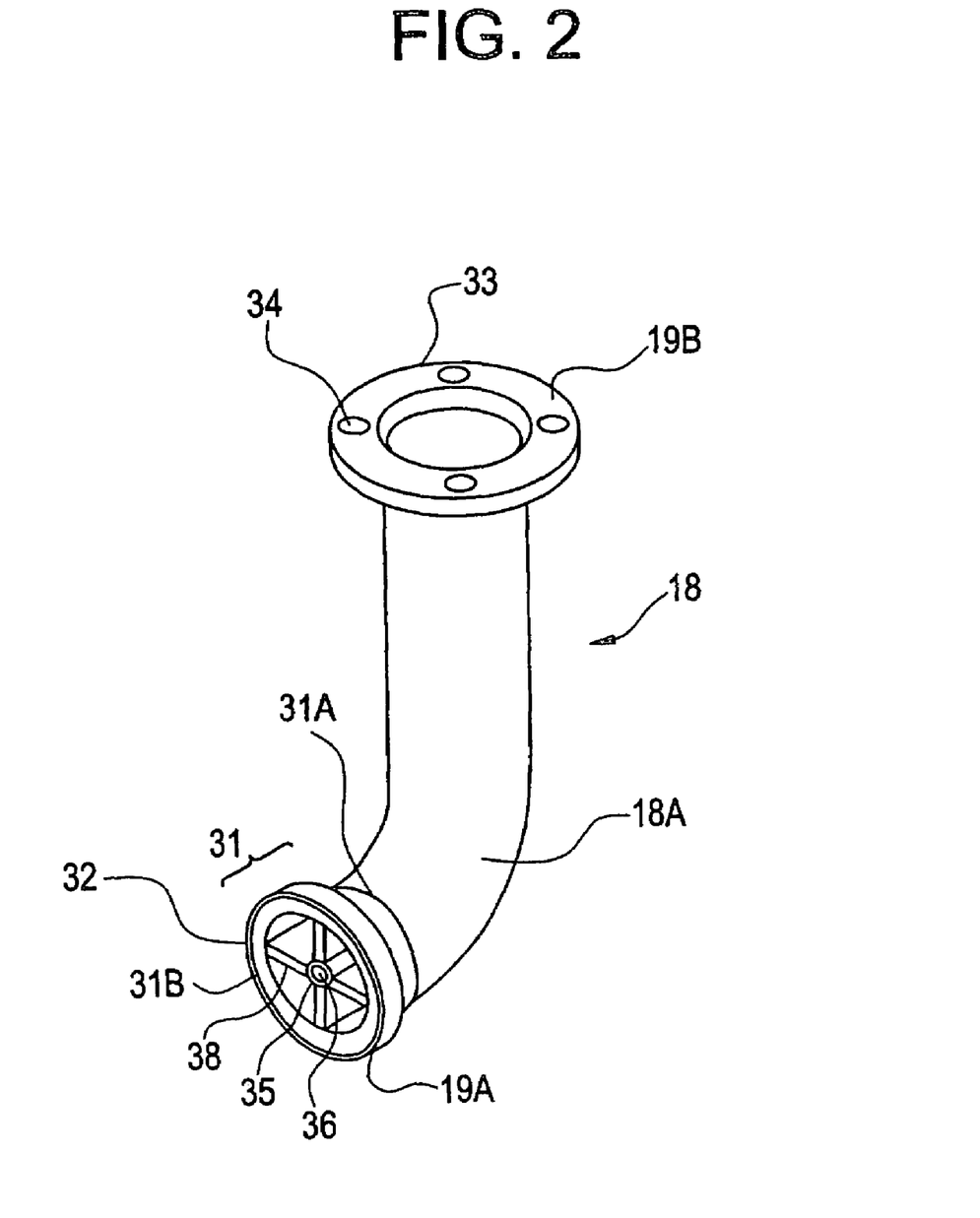
FIG. 2 is a detailed isometric view of a downcomer pipe coupling in accordance with an exemplary embodiment of the invention.

FIG. 2 is a detailed isometric view of a replacement downcomer elbow or lower sectional replacement (LSR) in accordance with an exemplary embodiment of the invention. As shown in FIG. 2, the replacement downcomer pipe 18 includes a first end 19A and a second end 19B. The first end 19A includes a cylindrical elbow flange 31 having a first end 31A and a second end 31B. First end 31A of the elbow flange 31 is configured to couple to replacement downcomer pipe 18 by any suitable means, for example by welding. Second end 31B includes a flange member 32 extending from the elbow flange 31. The flange member 32 may be received into a circular groove (not shown) machined into shroud 14. The groove can be located so as to be concentric with sparger T-box 22 (shown in FIG. 3) which penetrates through shroud 14. A center portion 35 having a threaded axial bore 36 therethrough is connected to elbow flange 31 by a plurality of vanes 38 extending from an inner surface of elbow flange 31 to center portion 35. The vanes 38 are designed to allow adequate passage of flow stream of cooling water. A draw bolt 70 threadedly engages axial bore 36 of the center portion 35. Draw bolt 70 connects replacement downcomer pipe 18 to anchor plate the legs of which bear on the internal curved surface of shroud 14. It should be appreciated that the draw bolt 70 may be preloaded so as to create a leak-tight joint at the connection on the shroud 14. The connection can be a tongue and groove type.

The second end 19B of replacement downcomer pipe 18 includes a mating flange 33 to be connected to coupling apparatus 30 which in turn is connected to the remnant of the downcomer pipe 16. The mating flange 33 may include four coupling slots 34 to receive four coupling bolts (not shown). The coupling slots 34 may accommodate angular rotational misalignment between the remnant downcomer pipe 16 and replacement downcomer pipe 18. Coupling bolts are designed to share the load and prevent eccentric loading. It should be appreciated that the mating flange 33 may include a spherical concave seat (shown in FIG. 2) to receive a seal ring (not shown) for accommodating misalignment of the downcomer pipe 18 and mating flange 33. The concave seat and seal ring in the mating flange 33 may allow angular articulation, along the vertical axis, between the remnant of downcomer pipe 16 and the replacement downcomer pipe 18.

FIG. 3 is an isometric view of a portion of a T-box assembly viewed from the inside of the RPV in accordance with an exemplary embodiment of the invention. The core spray system according to the invention supplies water to the reactor core region through the sparger T-box 22 which is penetrated through the shroud 14. A sparger T-box 22 is a junction where the core spray downcomer supply flowstream is directed to distribution sparger pipes 28, 30. As shown in FIG. 3, the T-box 22 is part of a section of sparger pipe 30 that is capped by a flat plate 41 welded at location 29 to end of pipe 30. Further, sparger pipe 30 is welded at location 27 on the sparger T-box 22 to form a piping tee. However, weld failure due to vibration fatigue, and/or weld cracking due to intergranular stress corrosion cracking (IGSCC) may cause one and/or both of the welds 27, 29 joining the pipe 30 to the sparger T-box 22 to fail. In the event that a through-wall circumferential cracking should occur at weld joints 27, 29, the core spray system may provide unpredictable leakage of fluid and fail to deliver the necessary volumetric flow rate to the reactor core.

Further, as shown in FIG. 3, the sparger pipe 30 includes vertical slots 58 to receive T-bolts 80 (shown in FIG. 8) which will be described in detail later. In general, the operation of the T-bolts 80 in the vertical slots 58 generally ensures the T-box clamp assembly 40 a tight seal against the sparger pipe 30. In other words, to maintain position of sparger pipes 28, 30 in relation to the sparger T-box 22 should welds fail. The vertical slots 58 may be machined into the sparger pipe 30 by any suitable method, for example, electrode discharge machining (EDM). Accordingly, the vertical slots 58 machined (EDM) in sparger pipe 30 are provided to receive the distal ends of the T-bolts 80. As will be discussed later, the T-bolts 80 may be oriented vertically and thus allowed to pass through the vertical slots 58 of the sparger pipe 30. As the T-bolts 80 are rotated 90 degrees by the action of rotating the T-bolt nuts 81, the "T" at the distal end of the T-bolt 80 may assume a horizontal orientation and come to bear against the inner surface of the sparger pipe 30.

Figure 4:
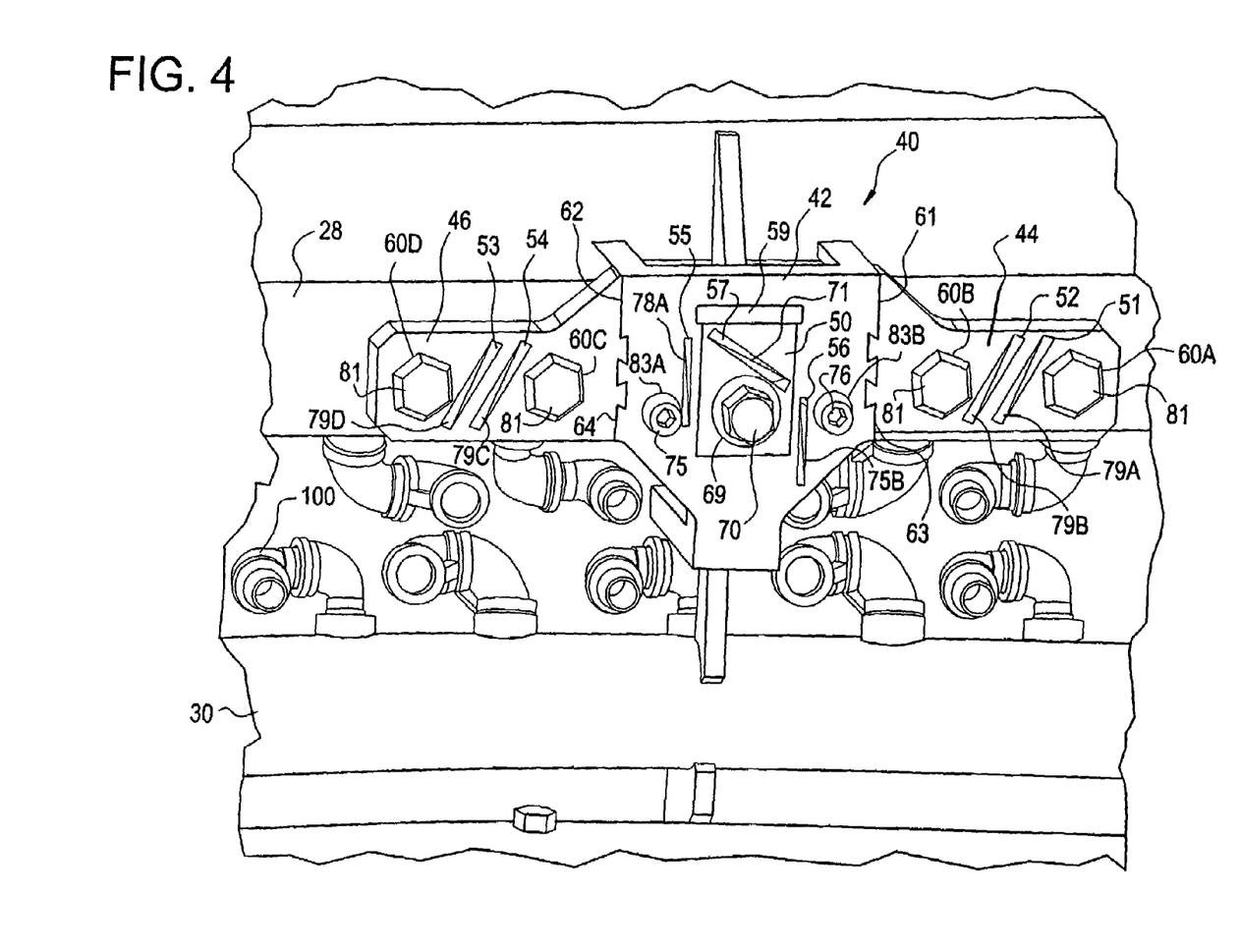
FIG. 4 is an isometric view of a T-box clamp assembly in the upper pipe configuration in accordance with an exemplary embodiment of the invention.

FIG. 4 is an isometric view of a T-box clamp assembly in the upper pipe configuration in accordance with an exemplary embodiment of the invention. The T-box clamp assembly 40 is to provide: 1) a restraining structure for the draw bolt 70 which passes through clearance hole in sparger T-box cover plate 41; and 2) a restraining structure for the core spray sparger pipes 28, 30 to limit movement of these pipes relative to the position of the sparger T-box 22 in the event that welds crack circumferentially.

As shown in FIG. 4, the T-box clamp assembly 40 includes an anchor plate 42, a first clamp block 44 and a second clamp block 46. The anchor plate 42 is positioned central to the T-box clamp assembly 40 with clamp blocks 44, 46 connected to opposite sides 61, 62, respectively of anchor plate 42. Clamp blocks 44 and 46 are positioned to be substantially aligned with one another. Specifically, clamp blocks 44 and 46 are connected to sides 61 and 62 of anchor with dove-tail joints 63 and 64, respectively. Dove-tail joints 63 and 64 permit clamp blocks 44, 46 to move relative to anchor plate 42 which eliminates the imposition of any stress on the sparger pipe 28 to sparger T-box weld 27.

The anchor plate 42 includes a substantially large recessed cavity 59 to accommodate an adjustable plate 50. Adjustable plate 50 provides a bearing surface for the draw bolt 70 and permit adjustments for the draw bolt 70 to receive central portion of the sparger T-box 22. As shown in FIG. 4, the adjustable plate 50 may move in the vertical direction because the recessed cavity 59 is relatively larger than the adjustable plate 50. The adjustable plate 50 includes a draw bolt opening 69 to receive the draw bolt 70 and a machined slot 57 to accommodate ratchet spring 71. The ratchet spring 71 includes ratchet teeth (not shown) that interface with draw bolt 70. The draw bolt 70 includes equally spaced ratchet teeth 72 (shown in FIG. 6) which are machined into the periphery of the proximal end 71A of draw bolt 70. As the draw bolt 70 is rotated in the direction to increase bolt preload, the springs behaves like a cantilever beam in deflecting the necessary distance to allow rotation of the draw bolt 70. The ratchet teeth 72 in the draw bolt 70 and ratchet teeth in the ratchet spring 71 are oriented such that rotation is permitted in only one direction. The draw bolt 70 can be removed only after the ratchet teeth in ratchet spring 71 have been cammed back to provide clearance for the subject teeth to rotate.

The anchor plate 42 includes openings 83A, 83B to receive seal plate bolts 75, 76. The openings 83A, 83B may be threaded to receive the seal plate bolts 75, 76. Anchor plate 42 further includes machined slots 55, 56 to accommodate latch springs 78A, 78B respectively. Latch springs 78A, 78B reside in slots 55, 56 and similarly function the same as ratchet spring 71 except latch springs 78A, 78B interface with seal plate bolts 75, 76, respectively. The seal plate bolts 75, 76 include equally spaced ratchet teeth 77 (shown in FIG. 7) which are machined into the periphery of the seal plate bolts 75, 76 head. The ratchet teeth 77 engage teeth of the latch springs 78A, 78B to lock the seal plate bolts 75, 76 in position and prevent the seal plate bolts 75, 76 from rotating. The rotation of the seal plate bolts 75, 76 may be performed with a hexagonal wrench which accommodates the internal hexagon slot in the head of seal plate bolts 75, 76. The load produced by the rotation advances the seal plate 74 against the T-box cover 41.

Clamp blocks 44 and 46 are attached to the anchor plate 42 at opposite sides 61, 62. Clamp block 44 includes T-bolt openings 60A, 60B extending therethrough and clamp block 46 includes T-bolt openings 60C, 60D extending therethrough. A T-bolt 80 (shown in FIGS. 8 and 9) extends through each opening 60A, 60B, 60C, 60D. Each T-bolt 80 may include a machined threaded section 86 on the end 80B of the T-bolt 80 so as to engage with internal threaded section 84 on T-bolt nut 81. The T-bolt nut 81 may preferably be threaded with an internal tap of ⅝ 18 UNF, for example. However, it should be appreciated that various tap dimensions may be used within the purview of this invention. Additionally, clamp block 44 includes machined slots 51, 52 to accommodate spring latches 79A, 79B, and clamp block 46 includes machined slots 53, 54 to accommodate spring latches 79C, 79D. Each spring latch 79A-79D includes ratchet teeth (not shown) to engage with T-bolt nut 81. T-bolt nut 81 includes equally spaced ratchet teeth 82 that are machined into the outer circumference of the head of T-bolt nut 81. Ratchet teeth 82 engage with spring latches 79A, 79B in clamp block 44 and spring latches 79C, 79D in clamp block 46. Spring latches 79A-79D lock the T-bolt nuts 81 and allow rotation in only one direction which may increase preload in the T-bolt 80. Further, an anti-rotation feature of the T-bolt 80 may be accomplished by a feature of a key 101 on T-bolt 80 (shown in FIG. 9), which interfaces with slot 102 integral with bore opening 87 of pipe seal 85 (shown in FIG. 10). The slot 102 in the bore 87 of the pipe seal 85 is designed to permit only 90 degrees rotation of the T-bolt 80. As the T-bolt nut 81 is rotated, the key 101 of the T-bolt may advance through the distal end (surface adjacent to the sparger pipes) of the pipe seal 85. As a result, the key 101 may reach the middle or intermediate section of the pipe seal bore 87 at which point the friction in the interfacing threads 86, 84 of the T-bolt 80 and T-bolt nut 81, respectively, may cause the T-bolt 80 to rotate 90 degrees. This action orients the distal "T" end 80A of the T-bolt 80 horizontally. As rotation of the T-bolt nut 81 is continued, the key 101 is drawn into the proximal section of the pipe seal bore 87. The proximal section of the pipe seal bore 87 in addition with an external key 88 of the pipe seal 85 interfacing in a slot 89 of the clamp block will lock the T-bolt 80 in the desired orientation. Accordingly, rotation of the T-bolt nut 81 will advance the distal "T" end 80A of the T-bolt 80 to come to bear against the internal surface of the sparger pipes 28, 30 and thus pull the contoured surface of the pipe seal 85 into full contact with the external surface of the sparger pipes 28, 30, and thus seal the remainder of the slot 58 in the sparger pipes 28, 30.

Figure 5:
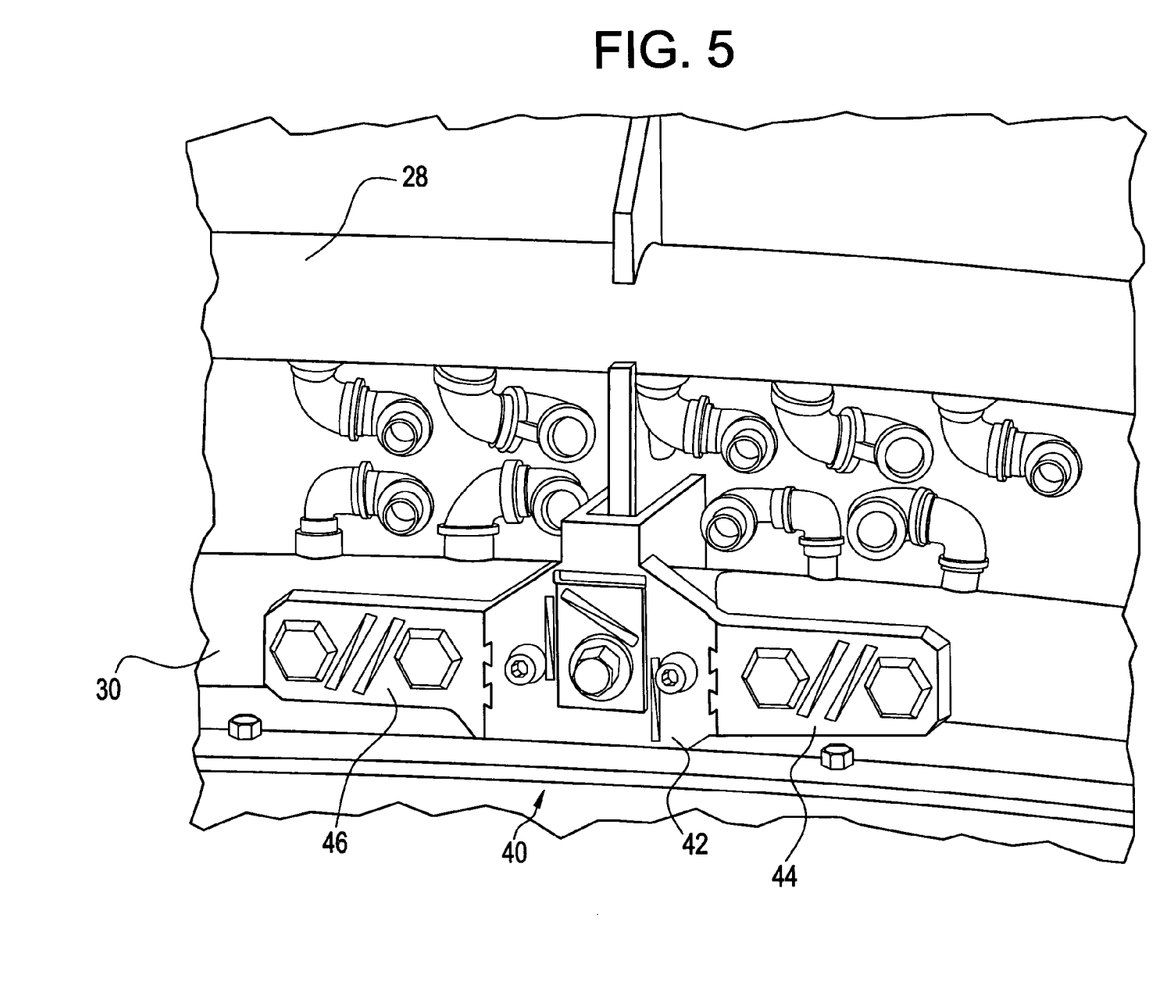
FIG. 5 is an isometric view of a T-box clamp assembly in the lower pipe configuration in accordance with an exemplary embodiment of the invention.

FIG. 5 is an isometric view of a T-box clamp assembly in the lower pipe configuration in accordance with an exemplary embodiment of the invention. It should be appreciated that the T-box clamp assembly 40 in FIG. 5 is a mirror-like image of the T-box clamp assembly 40 in FIG. 4 with the exception of the location of the assembly. In other words, the clamp assembly 40 in FIG. 5 is clamped on sparger pipe 30 whereas the clamp assembly 40 in FIG. 4 is clamped on sparger pipe 28.

Figure 6:
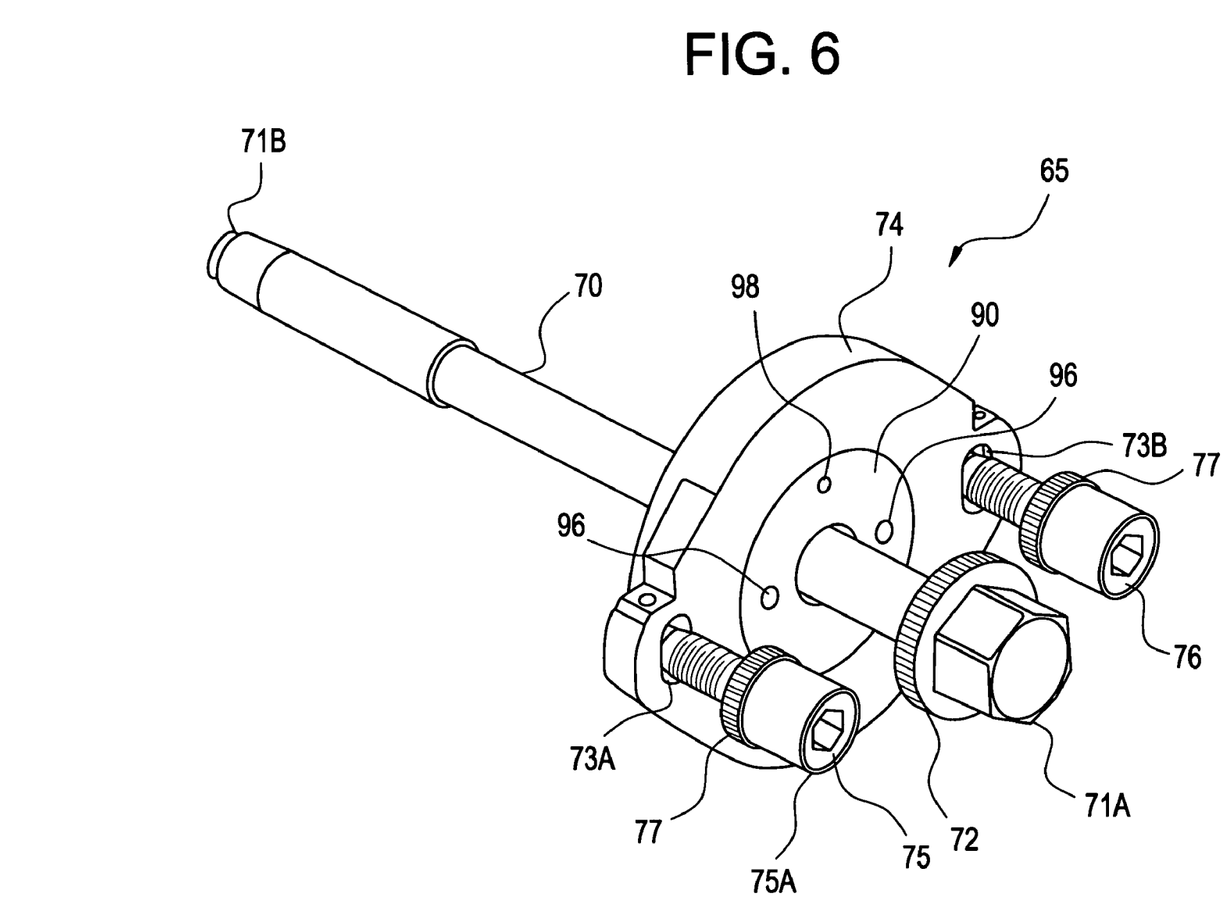
FIG. 6 is a detailed isometric view of a seal plate assembly in accordance with an exemplary embodiment of the invention.
Figure 7:
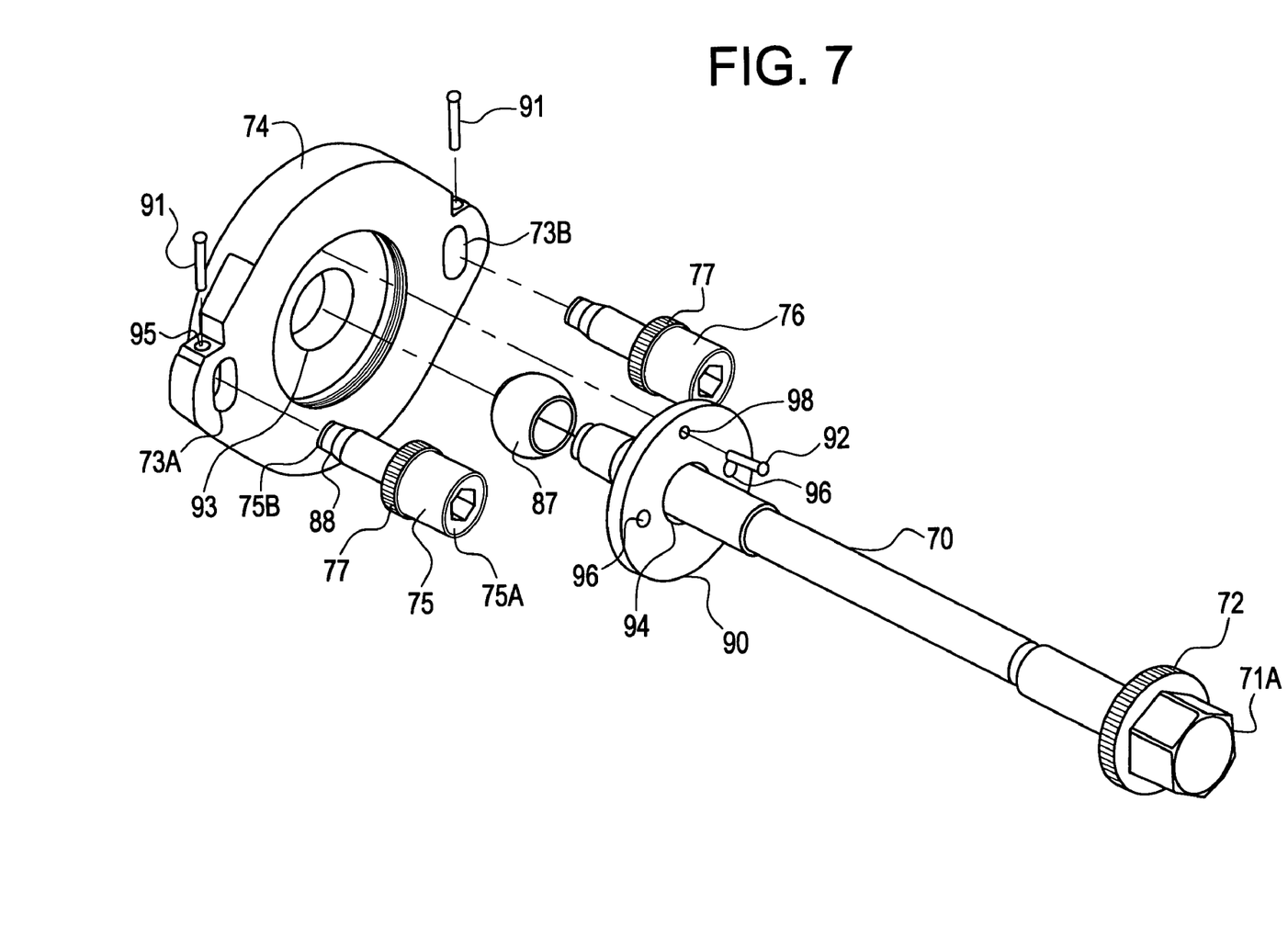
FIG. 7 is an exploded view of a seal plate assembly of FIG. 6 in accordance with an exemplary embodiment of the invention.

FIG. 6 is a detailed isometric view of a seal plate assembly in accordance with an exemplary embodiment of the invention. Referring to FIG. 6 and FIG. 7, the seal plate assembly 65 includes a seal plate 74, a seal plate cover 90, a draw bolt 70, seal plate bolts 75, 76 and a swivel sleeve 87. The seal plate 74 includes seal plate bolt openings 73A, 73B and a bolt opening 93. Seal plate 74 is coupled to anchor plate 42 with seal plate bolts 75, 76. Anchor plate 42 includes threaded adjusting screw openings 83A, 83B sized to receive seal plate bolts 75, 76. A distal end portions 75B and 76B of seal plate bolts 75, 76 includes a circumferential groove 88 sized to receive a dowel pin 91 pressed into seal plate 74 to secure seal plate bolts 75, 76 to seal plate 74. A shank portion of seal plate bolts 75, 76 are threaded into anchor plate bolt openings 83A, 83B. As seal plate bolts 75, 76 are torqued, seal plate 74 is advanced into close contact with exterior plate surface 41 of sparger T-box 22 to seal draw bolt opening 69 in T-box 22 and to hold the T-bolt cover plate 41 in position should sparger T-box cover weld 29 fail. The ratchet teeth 77 on seal plate bolts 75, 76 engage teeth of the latch springs 78A, 78B, respectively to lock the seal plate bolts 75, 76 in position and prevent the seal plate bolts 75, 76 from rotating loose. It will be appreciated that the seal plate 74 may provide a structural replacement for weld on the T-box 22, particularly weld 29 that joins the T-box plate cover 41 to T-box 22. Because plate cover 41 is welded to the T-box 22, the flat surface of the cover 41 may not be perfectly perpendicular to an axis of the sparger T-box 22 due to weld distortions. Thus, the seal plate 74 is designed to move or pivot in relation to plate cover 41 so as to interface properly.

The seal plate assembly 65 further includes a seal plate cover 90. Seal plate cover 90 includes a central opening 94 to receive draw bolt 70. Also included is smaller openings 96, 98 approximately surrounding the central opening 94. Openings 96 are approximately on the side (e.g., approximately left and right) of central opening 94 for accepting a tool (e.g., spanner wrench) for installation and tightening of cover 90. Opening 98 may receive dowel pin 92 to secure the seal plate cover 90 to the seal plate 74 and prevent the seal plate cover 90 from rotating. It should be appreciated that more than one opening 98 may be machined on the seal plate cover 90.

The swivel sleeve 87 may be in shape of a sphere. The spherical surface interfaces with the spherical surfaces (e.g., bolt opening 93) of the seal plate 74 and seal plate cover 90. The seal plate cover 90 is tightened to allow articulated movement of seal plate assembly 65 about the draw bolt 70, thus allowing the seal plate assembly 65 to conform to any possible weld distorted configuration of T-box cover 41. The bore of swivel sleeve 87 may be sized to receive draw bolt 70 in a close tolerance fit.

Figure 8:
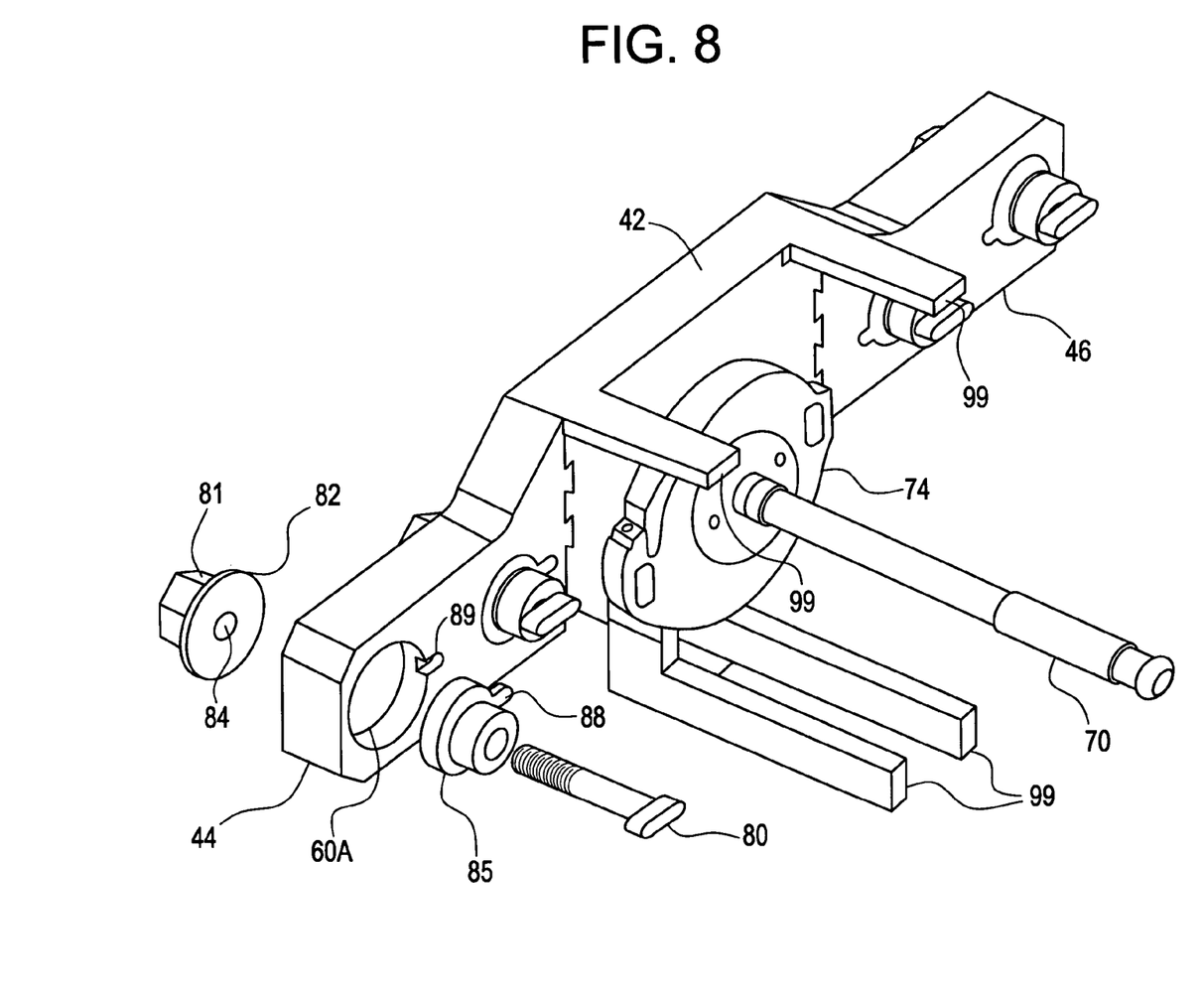
FIG. 8 is a partially exploded view of a T-box clamp assembly in accordance with an exemplary embodiment of the invention.
Figure 9:
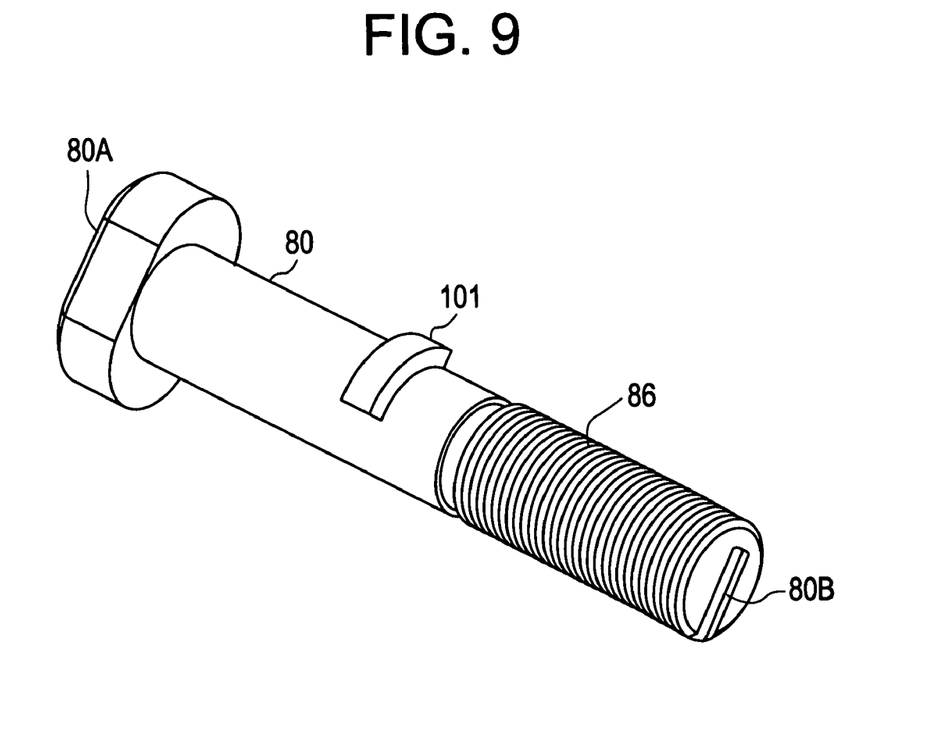
FIG. 9 is an isometric view of a T-bolt in accordance with an exemplary embodiment of the invention.
Figure 10:
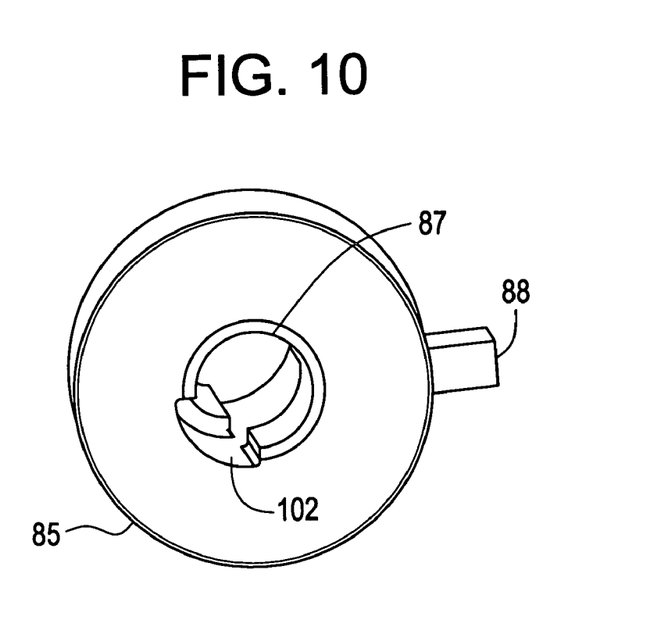
FIG. 10 is an isometric view of a pipe seal in accordance with an exemplary embodiment of the invention.

Referring to FIG. 8, anchor plate 42 includes plurality of legs 99 extending from a face of the anchor plate 42 to provide further support. The legs 99 on the anchor plate may also bear on the internal surface of the shroud, thus carrying the preload of the draw bolt and transmit load from anchor plate to the shroud. The legs 99 are configured to engage an inside surface of the shroud 14 and machined or trimmed so that the anchor plate 42 is parallel to the exterior surface of the sparger T-box 22. Attached at left end and right end of anchor plate 42 are clamp blocks 44, 46, respectively. As shown in FIG. 8, clamp blocks 44, 46 may each include a pair of T-bolts 80, T-bolt nuts 81 and pipe seals 85 to be assembled. It should be appreciated that the T-bolts 80, T-bolt nuts 81 and pipe seals 85 may be pre-assembled with the respective clamp blocks 44 and 46 prior to introduction into the reactor vessel. The proximal end 80A of T-bolts 80 may be inserted into vertical slots 58 (shown in FIG. 3), which may be EDM machined into sparger pipes 28 or 30. At the proximal end 80B of T-bolts 80, the T-bolts 80 threadingly engage T-bolt nuts 81. The T-bolts 80 may be rotated 90 degrees and then drawn up tight when providing a torque on T-bolt nuts 81 to bring pipe seals 85 into contact with sparger pipes 28 or 30, and thus seal slot openings 58. In order to achieve minimal leakage, the pipe seals 85 may be machined to match the contour of sparger pipes 28, 30. Further, the 90 degree rotation of the T-bolts 80 may be facilitated by the interfacing action of the key 101 in the T-bolt 80 with the slot 102 in the pipe seal bore 87, and an external key 88 on pipe seal 85 interfacing with slot 89 in clamp blocks 44, 46, as shown in FIGS. 8, 9 and 10. Moreover, the pipe seals 85 and T-bolt nuts 81 may include spherical seats to allow small articulation of pipe seals 85 against the sparger pipes 28, 30. The T-bolt nuts 81 may further be retained or locked in position via engaging with the ratchet latch springs 79A-79D. The ratchet teeth in the ratchet latch spring 79A-79D are oriented such that rotation is permitted in only one direction. Further, the torque produced by the rotation may draw the T-bolts 80 and pipe seals 85 tight against the inside and outside surfaces of the sparger pipes 28 or 30.

Referring back to FIG. 4, clamp blocks 44, 46 include openings 60A, 60B, 60C, 60D to accommodate T-bolts 80, T-bolt nuts 81 and pipe seals 85. As shown in FIG. 8, the openings 60A, 60B, 60C, 60D may include a slot opening 89 to receive an external key 88 on the pipe seals 85. The external key 88 prevents rotation and ensures proper orientation of the pipe seals 85 relative to the sparger pipes 28, 30. Thus, the clamp blocks 44, 46 may restrain the sparger pipes 28, 30 in relation to the sparger T-box 22. This prevents separation of the sparger pipes 28, 30 from the T-box 22 in the event of failure of welds.

The above described core spray sparger T-box attachment assembly mechanically couples downcomer pipe 16 to shroud 14 and sparger T-box 22. Further, the above described core spray sparger T-box attachment assembly provides a clamping system to provide structural integrity to the sparger T-box 22 and to hold the sparger pipes 28, 30 to T-box 22 welded joints together in the event that one or more welds should fail.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the sparger T-box attachment assembly comprising:
   a downcomer pipe coupling; and
   a sparger T-box clamp;
   wherein the downcomer pipe coupling includes a draw bolt,
   wherein the sparger T-box clamp includes:
      an anchor plate including side ends;
      a seal plate;
      a first clamp block substantially aligned at a first of the side ends;
      a second clamp block substantially aligned at a second of the side ends;
      a plurality of first bolts;
      a plurality of second bolts; and
      a plurality of third bolts;
   wherein the anchor plate further includes a first draw bolt opening configured to receive the draw bolt,
   wherein the seal elate includes a second draw bolt opening configured to receive the draw bolt,
   wherein the seal plate further includes a plurality of bolt openings configured to receive the third bolts,
   wherein the seal plate is coupled to the anchor plate with the plurality of third bolts,
   wherein the first clamp block is configured to be fixed to a first sparger distribution header pipe by the plurality of first bolts acting between the first clamp block and the first sparger distribution header pipe, and
   wherein the second clamp block is configured to be fixed to a second sparger distribution header pipe by the plurality of second bolts acting between the second clamp block and the second sparger distribution header pipe.

2. The attachment assembly of claim 1, wherein the anchor plate further includes:
   a plurality of openings configured to receive the third bolts and configured to align with the plurality of bolt openings of the seal plate.

3. The attachment assembly of claim 1, wherein the anchor plate and the first clamp block are connected by a first dovetail joint, and
   wherein the anchor plate and the second clamp block are connected by a second dovetail joint.

4. The attachment assembly of claim 1, wherein the first and second clamp blocks each include a plurality of aligned T-bolt openings configured to receive a T-bolt assembly, and
   wherein the T-bolt assembly includes a T-bolt, a T-bolt nut, and a pipe seal.

5. The attachment assembly of claim 4, wherein the T-bolt nut engages with a latch spring to permit rotation of the T-bolt nut in only one direction.

6. The attachment assembly of claim 4, wherein the T-bolt is inserted into a slot in a respective sparger distribution header pipe to provide the sparger T-box clamp with a tight seal against the respective sparger distribution header pipe.

7. The attachment assembly of claim 4, wherein the pipe seal is sealed adjacent to a respective sparger distribution header pipe.

8. The attachment assembly of claim 4, wherein bearing surfaces of the T-bolt nut, pipe seal, and first and second clamp blocks allow articulation of the T-bolt to ensure a tight seal with a respective sparger distribution header pipe.

9. The attachment assembly of claim 4, wherein the T-bolt includes a key that interfaces with a slot in a bore of the pipe seal to permit a 90-degree rotation of the T-bolt.

10. The attachment assembly of claim 4, wherein the pipe seal includes an external key to prevent rotation, and
    wherein the external key interfaces with a slot on the first or second clamp block.

11. The attachment assembly of claim 1, further comprising:
    a plurality of legs extending from a face of the anchor plate;
    wherein the plurality of legs is configured to engage an inside surface of the shroud.

12. The attachment assembly of claim 1, wherein the draw bolt engages a latch spring to permit rotation of the draw bolt in only one direction.

13. The attachment assembly of claim 1, wherein the third bolts include a circumferential groove at one end of the third bolts,
    wherein each of the third bolts is coupled to the seal plate by a respective dowel pin,
    wherein the respective dowel pin extends at least partially into the seal plate, and
    wherein the respective dowel pin is positioned to interface with the circumferential groove.

14. The attachment assembly of claim 1, wherein the anchor plate further includes:
    a plurality of bolt openings configured to accommodate the third bolts; and
    a plurality of slots configured to accommodate a plurality of latch springs.

15. The attachment assembly of claim 1, wherein the first clamp block includes a plurality of openings configured to accommodate the first bolts,
    wherein the first clamp block includes a plurality of slots configured to accommodate a plurality of latch springs,
    wherein the second clamp block includes a plurality of openings configured to accommodate the second bolts, and
    wherein the second clamp block includes a plurality of slots configured to accommodate a plurality of latch springs.

16. The attachment assembly of claim 1, wherein the first clamp block includes a plurality of openings configured to accommodate the first bolts, and
    wherein the first clamp block includes a plurality of slots configured to accommodate a plurality of latch springs.

17. The attachment assembly of claim 1, wherein the second clamp block includes a plurality of openings configured to accommodate the second bolts, and
    wherein the second clamp block includes a plurality of slots configured to accommodate a plurality of latch springs.

18. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the sparger T-box attachment assembly comprising:
    a downcomer pipe coupling; and
    a sparger T-box clamp;
    wherein the downcomer pipe coupling includes a draw bolt,
    wherein the sparger T-box clamp includes:
       an anchor plate including side ends;
       a first clamp block substantially aligned at a first of the side ends;

a second clamp block substantially aligned at a second of the side ends;
a plurality of first T-bolts; and
a plurality of second T-bolts;
wherein the anchor plate further includes a first draw bolt opening configured to receive the draw bolt,
wherein the first clamp block is configured to be fixed to a first sparger distribution header pipe by the plurality of first T-bolts acting between the first clamp block and the first sparger distribution header pipe, and
wherein the second clamp block is configured to be fixed to a second sparger distribution header pipe by the plurality of second T-bolts acting between the second clamp block and the second sparger distribution header pipe.

19. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the sparger T-box attachment assembly comprising:
a downcomer pipe coupling; and
a sparger T-box clamp;
wherein the downcomer pipe coupling includes a draw bolt,
wherein the sparger T-box clamp includes:
an anchor plate including side ends;
a first clamp block substantially aligned at a first of the side ends;
a second clamp block substantially aligned at a second of the side ends;
two first T-bolts; and
two second T-bolts;
wherein the anchor plate further includes a draw bolt opening configured to receive the draw bolt,
wherein the first clamp block is configured to be fixed to a first sparger distribution header pipe by the two first T-bolts acting between the first clamp block and the first sparger distribution header pipe, and
wherein the second clamp block is configured to be fixed to a second sparger distribution header pipe by the two second T-bolts acting between the second clamp block and the second sparger distribution header pipe.

20. The attachment assembly of claim 18, further comprising: a seal plate coupled to the anchor plate with a plurality of third bolts; wherein the seal plate includes:
a plurality of bolt openings configured to receive the third bolts; and
a second draw bolt opening configured to receive the draw bolt.

* * * * *